US007716463B2

(12) United States Patent
Holladay et al.

(10) Patent No.: US 7,716,463 B2
(45) Date of Patent: *May 11, 2010

(54) DEPLOYING AND RECEIVING SOFTWARE OVER A NETWORK SUSCEPTIBLE TO MALICIOUS COMMUNICATION

(75) Inventors: Martin L. Holladay, Bremerton, WA (US); Mukesh Karki, Issaquah, WA (US); Parthasarathy Narayanan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 916 days.

This patent is subject to a terminal disclaimer.

(21) Appl. No.: 10/966,666

(22) Filed: Oct. 15, 2004

(65) Prior Publication Data
US 2006/0059542 A1 Mar. 16, 2006

Related U.S. Application Data

(63) Continuation of application No. 10/941,594, filed on Sep. 15, 2004, now Pat. No. 7,610,477.

(51) Int. Cl.
*G06F 9/00* (2006.01)
(52) U.S. Cl. .................. 713/2; 713/1; 713/191; 705/56; 726/11
(58) Field of Classification Search .................. 713/1, 713/2, 191; 705/56; 726/11, 14; 717/171, 717/176
See application file for complete search history.

(56) References Cited

U.S. PATENT DOCUMENTS

| 6,347,397 | B1 | 2/2002 | Curtis |
| 6,360,365 | B1 | 3/2002 | Curtis |
| 6,389,592 | B1 | 5/2002 | Ayres et al. |
| 6,418,554 | B1 | 7/2002 | Delo et al. |
| 6,487,718 | B1 | 11/2002 | Rodriguez et al. |
| 6,587,837 | B1 | 7/2003 | Spagna et al. |
| 6,611,812 | B2 | 8/2003 | Hurtado et al. |
| 6,618,857 | B1 | 9/2003 | Zimniewicz et al. |
| 6,993,650 | B2 * | 1/2006 | Landers et al. ............... 713/100 |
| 7,401,362 | B2 * | 7/2008 | Holladay et al. ............... 726/22 |
| 2001/0016880 | A1 | 8/2001 | Cai et al. |
| 2002/0131072 | A1 | 9/2002 | Jackson |
| 2002/0165864 | A1 | 11/2002 | Azagury et al. |
| 2003/0009657 | A1 | 1/2003 | French et al. |
| 2003/0097431 | A1 * | 5/2003 | Dill ........................... 709/221 |
| 2003/0145317 | A1 | 7/2003 | Chamberlain |

(Continued)

OTHER PUBLICATIONS

Windows Server 2003, Automated Deployment Services Technical Overview, Microsoft Corporation, Published: Aug. 2003.

(Continued)

*Primary Examiner*—Matthew B Smithers
*Assistant Examiner*—Paul Callahan
(74) *Attorney, Agent, or Firm*—Lee & Hayes, PLLC

(57) ABSTRACT

Systems and/or methods that enable secure deployment and/ or receipt of an operating system and/or updates for the operating system to a computer across a network susceptible to malicious communication are described. These systems and/ or methods can, in one embodiment, enable a bare computer added to a network to have an operating system deployed to it and updated via the network before the bare computer is subjected to malicious code communicated over the network.

22 Claims, 3 Drawing Sheets

U.S. PATENT DOCUMENTS

2004/0006689 A1      1/2004    Miller et al.
2005/0289533 A1*   12/2005   Wang et al. .................. 717/168

OTHER PUBLICATIONS

Curtis, et al., "Adaptable Caching techniques for reconfigurable computing Systems" IEEE, 2005, pp. 481-485.

Dinda, "Design, Implementation, and Performance of an extensible toolkit for resource prediction in distributed systems" IEEE, 2006, pp. 14.

Ivan, et al.,"Partitionable Services: A framework for seamlessly adapting distributed applications to heterogeneous environments" IEEE, 2002, pp. 10.

"Veritas OpForce Architecture Overview", Veritas Software Corporation, 2003, pp. 9.

Micorsoft Corporation, "Chapter 1:Choosing an Automated installation method" Microsoft Windows Server 2003 Deployment Kit, Apr. 14, 2004, pp. 1-18, Retrieved from the Internet:http//downloads.microsoft.com/download/e/2/b/e2bfb017-8525-4991-bbd5-7d7081f3d228.

Microsoft Corporation, "Using Windows XP Professional with Service Pack 2 in a Managed Environment: Controlling Communication with the Internet", Retrieved for the Internet: http://www.microsoft.com/downloads/details.aspx?FamilyID=e6a35441-918f-4022-b973-e7fc0d1d2917&DisplayLang=en, Published: Jul. 2004.

Foreign Search Report dated Feb. 21, 2006 relating to application No. EP 05 1081 54.

* cited by examiner

DEPLOYING AND RECEIVING SOFTWARE OVER A NETWORK SUSCEPTIBLE TO MALICIOUS COMMUNICATION

CROSS REFERENCE TO RELATED PATENT APPLICATION

This is a continuation of and priority is claimed to co-pending U.S. patent application Ser. No. 10/941,594 and a filing date of Sep. 15, 2004, now U.S. Pat. No. 7,610,477, for DEPLOYING AND RECEIVING SOFTWARE OVER A NETWORK SUSCEPTIBLE TO MALICIOUS COMMUNICATION, of Holladay, et al. This co-pending U.S. Patent Application is commonly assigned herewith and is hereby incorporated herein by reference for all that it discloses.

TECHNICAL FIELD

This invention relates to deploying and receiving software over a network.

BACKGROUND

One of the quickest and easiest ways to add a new, bare server (a server not having an operating system) to a network is to plug it into the network and use a deployment server on the network to deploy an image of the operating system to the bare server. The bare server can save this image to its hard disk drive or equivalent storage and then reboot. Once it reboots, it can be running with the newly deployed operating system.

Operating systems deployed to bare servers with an image are often out of date, however; they need current updates to be optimally secure. A server with an out-of-date operating system, if it is linked to the network, can acquire these updates through the network, usually from an Internet site or an intranet server having current updates.

But the network, even if it is an intranet, may be susceptible to malicious communication, such as a virus or other network-based attack. Because of this, the server often cannot acquire these updates before being attacked by malicious code via the network. In the amount of time between when the server is first running with its operating system on the network and when it has downloaded and installed current updates, malicious code like a virus or Trojan horse can attack the server. This is a real danger, as many malicious programs take less than a second to corrupt a server running an out-of-date operating system. The MS Blaster virus, for instance, can corrupt a server without an appropriate software update within tenths of a second.

To partially combat this problem, a bare server can be connected to a deployment server without being connected to a network, such as by manually plugging a cable into both servers. Through this cable, the deployment server can deploy an image having an operating system to the bare server. The server can then be rebooted with the operating system. Once this is done, updates can be installed, usually by hand with compact disks, to make the operating system optimally secure. Once updated, the server can then be plugged into the network. This partial solution may reduce the server's vulnerability to attack, but it is time consuming. An information technology specialist can spend many hours connecting bare servers directly to a deployment server, deploying images, installing updates, disconnecting the servers from the deployment server, and then connecting them to the network.

Also to partially combat this problem, the operating system and updates can be manually installed on a bare server, usually with many compact disks, prior to connecting the server to the network. Manually installing an operating system and updates, however, is also time consuming and tedious; it can takes hours for each server.

There is, therefore, a need for a secure way to deploy an operating system and updates to a server over a network that is susceptible to malicious communication.

SUMMARY

Systems and/or methods ("tools") that enable secure deployment and/or receipt of an operating system and updates for the operating system to a bare computer across a network are described. In one embodiment, for instance, the tools enable a bare computer added to a network to have an operating system deployed to it and updated via the network before the bare computer is subjected to malicious code communicated over the network.

BRIEF DESCRIPTION OF THE DRAWINGS

The same numbers are used throughout the disclosure and figures to reference like components and features.

DETAILED DESCRIPTION

An Exemplary Architecture

Figure 1:
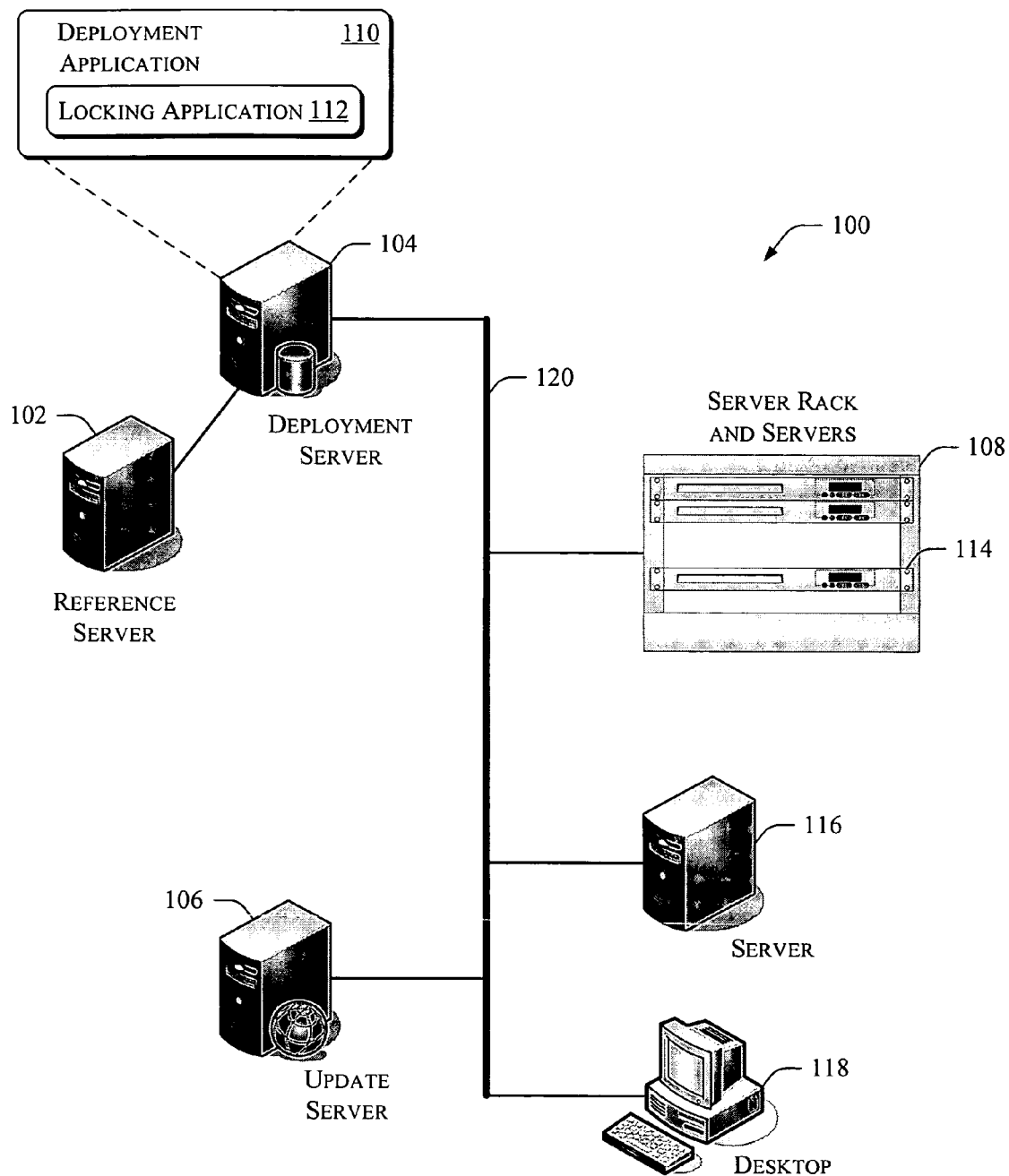
FIG. 1 illustrates an exemplary architecture having exemplary servers, a network susceptible to malicious communication, and bare computers.

Referring to FIG. 1, an exemplary architecture 100 is shown having a reference server 102, a deployment server 104, an update server 106, and a server rack 108. The reference server, deployment server, and update server are shown as three separate servers, though they can be combined into one or more servers in any combination. The deployment server comprises computer-readable media capable of performing one or more of the processes described below. These media can comprise a deployment application 110 and a locking application 112, for instance. The locking application is shown as part of the deployment application, though each can be separate or combined. The update server also comprises computer-readable media, here capable of deploying software patches, fixes, and the like, such as to update an out-of-date operating system for improving its operation, e.g., its security capabilities.

Three exemplary bare computers are also shown, a bare server 114 in rack 108, a bare stand-alone server 116, and a bare desktop 118. Each of the bare computers has a software or hardware application sufficient to enable the bare computer to request, receive, and follow basic instructions, such as from the deployment application 110.

The architecture 100 communicates across a network 120. The network is a communication network susceptible to malicious communication, such as network-based attacks. This network can comprise an intranet in communication with an insecure source, such as the Internet or a corrupted computer within the intranet capable of sending malicious code across the network.

Building a Locked Image

Figure 2:
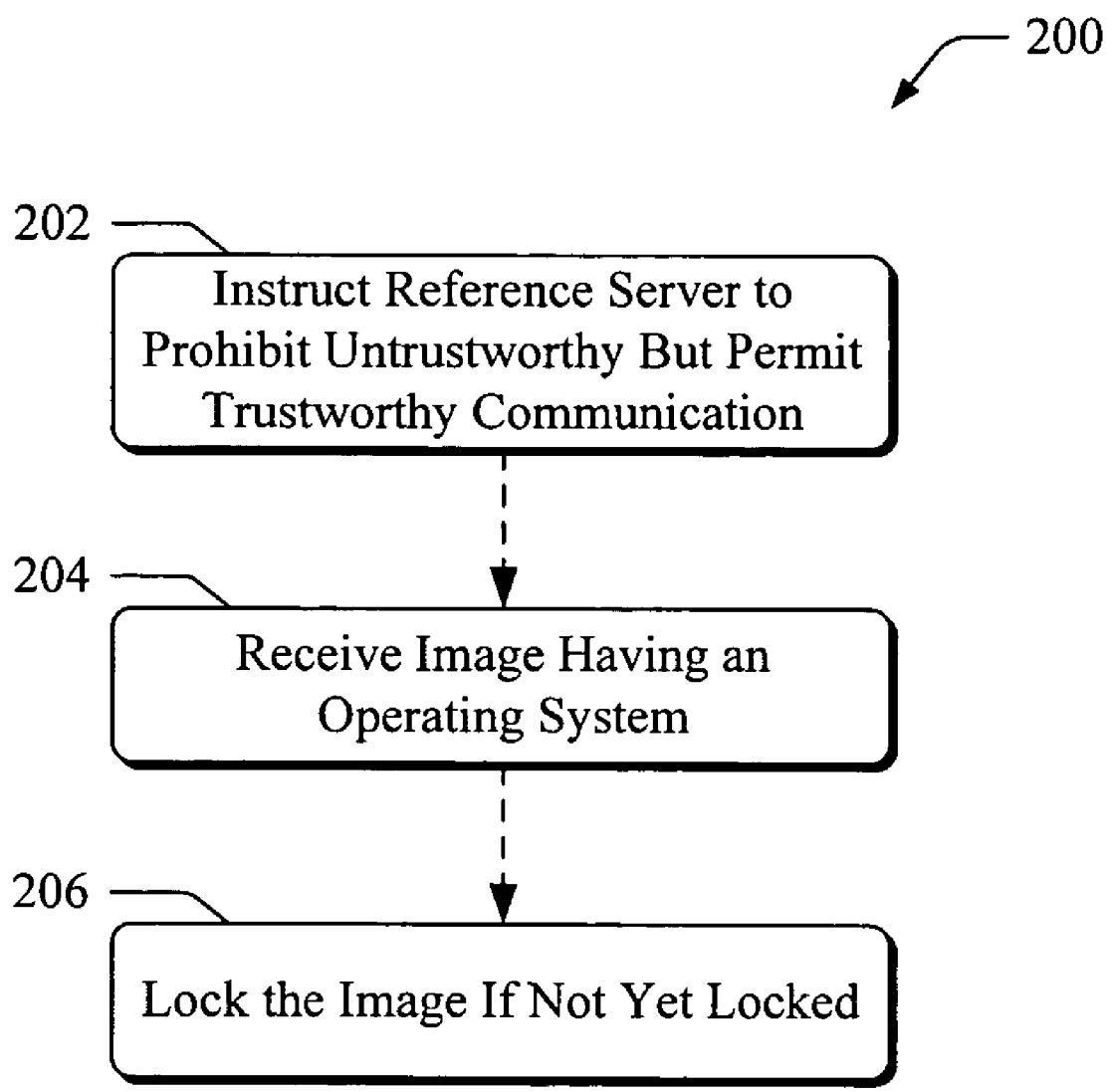
FIG. 2 sets forth a flow diagram of an exemplary process for creating a locked image having an operating system.

Referring to FIG. 2, an exemplary process 200 for building a locked image is shown. This process is illustrated as a series of blocks representing individual operations or acts performed by deployment server 104, such as with locking application 112. This and other processes described herein may be implemented in any suitable hardware, software, firmware, or combination thereof. In the case of software and firmware, these processes represent sets of operations implemented as computer-executable instructions.

At block 202, deployment server 104, using locking application 112, instructs reference server 102 to prohibit communications with untrustworthy sources but permit communication with at least one trustworthy source, such as the deployment server. The prohibited communications can comprise all communications that are not solicited by the reference server or all communications, solicited or not (other than those permitted from the trustworthy source).

In one embodiment, the locking application selectively prohibits communication by instructing the reference server to enable a firewall prohibiting communication with any port other than the port used by the deployment server. In another embodiment, the locking application does so by instructing the reference server to enable one or more protocols, such as IPSec ("Internet Protocol Security"), which can prohibit communication with any computer other than the deployment server (and, in some cases, update server 106). In both embodiments, the reference server is instructed to alter its settings to operate securely but permit communication with at least one trustworthy source.

These settings are stored in the memory of the reference server. Because of this, an image of the reference server's memory can comprise the operating system and these settings. A bare computer booting up this image can run the operating system having these settings, thereby prohibiting potentially dangerous communications but permitting communication with a trustworthy source. If the bare computer that is to receive the image is a desktop or other non-server computer, the reference server can be a reference desktop or other non-server reference computer.

At block 204, deployment server 104 receives an image having an operating system. In one embodiment, the deployment server performs blocks 204 and 206 and in another embodiment performs blocks 202 and 204, as set described below. This image can be received from the reference server of FIG. 1 or another reference computer (not shown). If the image is locked, such as resulting from the actions of block 202, the deployment server does not proceed to block 206. If the image is not locked, the deployment server proceeds to block 206. In another embodiment, the deployment server waits to lock the image until after the image has been saved to the bare server but before the bare server reboots (not shown).

At block 206, the deployment server, through locking application 112, edits an image having an operating system. This editing can comprise locking the image by altering a security setting to prohibit unsolicited communications except from at least one trustworthy source, such as deployment server 104. The prohibited communications can comprise all communications that are not solicited by the computer running the operating system or all communications, solicited or not (other than those permitted from the trustworthy source). The locking application can do so by editing the image's security setting(s) to add or turn on a firewall like the firewall described in block 202. The locking application can also do so, for instance, by editing the image's security setting(s) to comprise IPSec protocols, such as those described in block 202. Thus, the locking application locks the image to prohibit potentially dangerous communications by a computer running the software in the image but permit communication with a trustworthy source.

Deploying a Locked Image and Updating an Operating System

Figure 3:
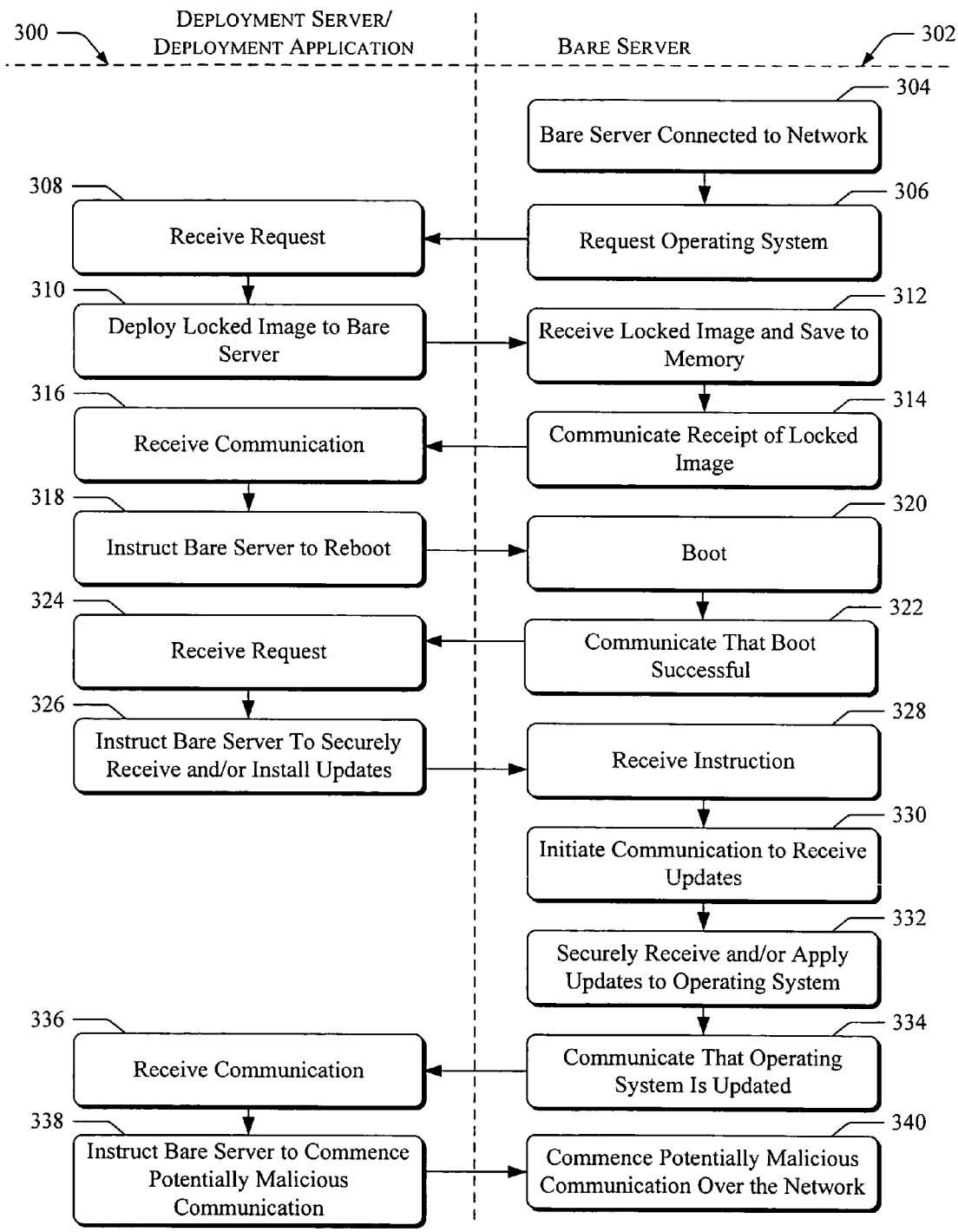
FIG. 3 sets forth a flow diagram of an exemplary process for deploying and receiving a locked image and updates via a network susceptible to malicious communication.

Referring to FIG. 3, an exemplary process 300 for securely deploying, via a network susceptible to malicious communication, an image having an operating system and enabling secure receipt of an update for the operating system is shown. This process is illustrated as a series of blocks representing individual operations or acts performed by deployment server 104, such as with deploying application 110. An exemplary process 302 for securely receiving the locked image and updates to the operating system is also shown. Process 302 is illustrated as a series of blocks representing operations or acts performed by or to bare server 114.

At block 304, a bare computer is connected to network 120. In the ongoing embodiment, bare server 114 is plugged into the network via rack 108, though other bare computers can instead be connected to the network, such as stand-alone server 116 or desktop 118.

At block 306, the bare server communicates across the network, requesting an operating system. Without an operating system, the bare server often is not yet vulnerable to malicious code on the network.

At block 308, deployment server 104 receives the request for an operating system. At block 310, the deployment server, through deployment application 110, securely deploys a locked image having an operating system to the bare server. At this block, the deployment server can, in some embodiments, also deploy software updates. The locked image can be the result of the process 200. In the ongoing embodiment, the locked image is one that, when run by the bare server (which will then no longer be bare), will not permit receipt of unsolicited communication from any source other than the deployment server or any port other than the port used by the deployment server.

At block 312, the bare server securely receives the locked image via the network and saves it to memory. By securely receiving the locked image, the bare server can receive the locked image without its being subject to malicious communication during transmission. Secure communication of this locked image can also prohibit it from being intercepted or monitored by a third party. In one embodiment, the bare server also receives updates with or as part of the locked image. At block 314, the bare server communicates that it has received the locked image. At block 316, the deployment server receives the communication from the bare server indicating that it has received the locked image. At block 318, the deployment server, through the deployment application, instructs the bare server to boot the locked image.

At block 320, the bare server reboots, thereby running the image with the operating system and its secure settings. The bare server, now no longer bare as it has an operating system, is running in a secure mode. The bare server, because of settings and/or software in the image, can prohibit untrustworthy or potentially malicious communications. The bare server can operate securely even though it is connected to network 120 and potentially is operating with an out-of-date operating system that could otherwise be vulnerable to malicious communication sent over the network.

At block 322, bare server 114 informs the deployment server that the operating system is running and/or that the boot was successful.

At block 324, deployment server 104 receives this information. At block 326, the deployment server, through deployment application 110, instructs the bare server to securely receive and/or install updates. In the ongoing embodiment, the deployment server instructs the bare server to initiate communication with update server 106. In another embodiment, the deployment server securely sends updates to the bare server's operating system and instructs it to add these updates without use of a separate update source like the update server. In still another embodiment, the updates are received along with or as part of the image received at block 312 and sent at block 310. In this embodiment, the deployment server instructs the bare server to install the already received updates. The updates received in any of these embodiments can be effective to update the operating system or other software on the bare server, and can comprise software patches, fixes, and the like. These updates can improve resistance to various malicious code later received by the bare server, described in greater detail below.

At block 328, the bare server receives the instruction to securely receive updates. In the ongoing embodiment, the bare server receives the instruction from the deployment server.

At block 330, the bare server initiates secure communication to securely receive updates. In the ongoing embodiment, the bare server solicits communication from update server 106. The bare server's security settings are configured to prevent receipt of unsolicited communication, but the bare server is permitted to solicit communication from the update server. By so doing, updates and other information from the solicited update server can be received by the bare server running the operating system. Other, unsolicited information, can be refused by the bare server because of its security settings, thereby protecting the bare server from unsolicited, malicious code while enabling the bare server to receive updates.

At block 332, the bare server securely receives and applies updates to its operating system. These updates can be received via the network from the update server solicited at block 330 or from the deployment server directly, for instance. This secure receipt of updates enables the bare server to have an updated operating system via a network that is susceptible to malicious communication without first being vulnerable to malicious code communicated over the network.

At block 334, the bare server communicates that it has updated its operating system. At block 336, the deployment server receives this communication.

At block 338, the deployment server instructs the bare server to commence potentially malicious communication. Because the operating system is updated, the bare server is better capable of defending itself against malicious code and attacks communicated across the network. In one embodiment, the deployment server sends and/or instructs the bare server to install a firewall or IPSec protocols to further secure the bare server's operations before commencing potentially malicious communication.

At block 340, the bare server commences potentially malicious communication over the network, such as by commencing a production mode of operation. The bare server can do so by opening particular ports, for instance. If the bare server is to be a webserver, for instance, it can open port 80 to enable it to communicate with other servers across the Internet.

In the ongoing embodiment, most if not all of the acts of the deployment server and the deployment application can be performed automatically and without user interaction. This enables a user to connect a bare server or other bare computer to a network and, without further interaction, have the bare server operating with an updated operating system without having to subject the bare server to malicious code via the network before the operating system is updated.

CONCLUSION

The above-described tools enable secure deployment and/or receipt of an operating system and updates across a network that can be susceptible to malicious communication. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
    enabling a bare computer capable of communicating through a network that is susceptible to malicious communication to request and receive an operating system and security settings via the network, whereby the security settings are configured to instruct the bare computer to effectively prohibit receiving potentially malicious communication other than from a secure source via the network, wherein potentially malicious communications comprises unsolicited communications;
    enabling the bare computer to receive, prior to the bare computer being subjected to potentially malicious communication via the network, an update to the operating system via the network;
    enabling the bare computer, without user interaction, to commence potentially malicious communication over the network after the bare computer has applied the update to the operating system.

2. The method of claim 1, wherein the bare computer comprises a bare server.

3. The method of claim 1, wherein the operating system is received as an image.

4. The method of claim 3, wherein the image comprises the security settings capable of prohibiting the bare computer from receiving insecure communication via the network.

5. The method of claim 1, wherein the update is capable of modifying the operating system's security.

6. The method of claim 1, further comprising:
    enabling the bare computer to apply the update prior to the bare computer being subjected to potentially malicious communication via the network.

7. The method of claim 6, wherein the acts of enabling are performed without user interaction.

8. One or more computer-readable storage media having computer-readable instructions that, when executed by a computer, perform the method as recited in claim 1.

9. A system comprising one or more computer-readable storage media having computer-readable instructions that, when executed by a computer, perform the method as recited in claim 1.

10. A method comprising:
    enabling a bare computer to request an operating system through a network susceptible to malicious communication;
    enabling the bare computer to automatically receive, through the network susceptible to malicious communication, the operating system and instructions, the instructions directing the bare computer to run in a secure mode that effectively prohibits the computer from receiving malicious communications via the network, wherein malicious communications comprises unsolicited communications;

enabling the bare computer to automatically communicate via the network that the operating system has been installed;

enabling the bare computer to automatically receive, through the network susceptible to malicious communication, an update to the operating system;

enabling the bare computer to automatically apply the update prior to the bare computer being subjected to potentially malicious communication via the network;

enabling the bare computer to automatically communicate via the network that the update to the operating system has been installed; and enabling the bare computer to automatically terminate the secure mode without user interaction and commence potentially malicious communication over the network after the bare computer has applied the update to the operating system.

11. The method of claim 10, wherein the act of enabling the bare computer to receive the operating system is performed without the bare computer being subjected to potentially malicious communication via the network.

12. The method of claim 10, wherein the operating system is received as an image.

13. The method of claim 12, wherein the image comprises security settings capable of prohibiting the bare computer from receiving potentially malicious communication via the network.

14. The method of claim 10, wherein the bare computer comprises a bare server.

15. The method of claim 10, wherein the update is capable of modifying the operating system's security.

16. The method of claim 10, wherein the acts of enabling are performed without user interaction.

17. One or more computer-readable storage media having computer-readable instructions that, when executed by a computer, perform the method as recited in claim 10.

18. A system comprising one or more computer-readable storage media having computer-readable instructions that, when executed by a computer, perform the method as recited in claim 10.

19. A method comprising:

enabling a bare computer capable of communicating through a network that is susceptible to potentially malicious communication to request and receive an operating system and configured security settings via the network;

enabling the bare computer to boot the operating system effective to run the operating system in a secure mode based on the configured security settings, wherein the secure mode effectively prohibits the bare computer from receiving unsolicited and potentially malicious communication via the network;

enabling the bare computer to receive instructions via the network to securely receive an update to the operating system;

enabling the bare computer to receive and install the update to the operating system via the network;

enabling the bare computer to communicate via the network that the update to the operating system has been installed; and enabling the bare computer to terminate the secure mode without user interaction and commence potentially malicious communication over the network after the bare computer has applied the update to the operating system.

20. The method of claim 19, wherein the operating system is received as an image.

21. The method of claim 19, wherein the update is capable of modifying the operating system's security.

22. The method of claim 19, wherein the enabling is performed without user interaction.

* * * * *